(12) United States Patent
Yu

(10) Patent No.: US 8,400,783 B2
(45) Date of Patent: Mar. 19, 2013

(54) DOCKING STATION FOR ELECTRONIC DEVICE

(75) Inventor: Wen-Ching Yu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 187 days.

(21) Appl. No.: 13/092,967

(22) Filed: Apr. 24, 2011

(65) Prior Publication Data

US 2012/0218722 A1    Aug. 30, 2012

(30) Foreign Application Priority Data

Feb. 24, 2011    (CN) .................. 2011 2 0046407 U

(51) Int. Cl.
*H05K 7/14* (2006.01)
(52) U.S. Cl. ....................................... 361/801
(58) Field of Classification Search .................. 361/801, 361/679.01, 679.02, 679.08, 679.3, 679.41, 361/679.43, 679.44, 679.47, 679.55, 696
See application file for complete search history.

*Primary Examiner* — Jeremy Norris
*Assistant Examiner* — Tremesha S Willis
(74) *Attorney, Agent, or Firm* — Altis Law Group, Inc.

(57) ABSTRACT

A docking station includes an enclosure, two hook assemblies, a transmission assembly, a button and a pusher assembly. The enclosure defines a receiving room, two first through holes and a second through hole. The hook assemblies pass through the first through holes to secure an electronic device. The transmission assembly engages with the hook assemblies to drive the hook assemblies move forward and backward in the first through holes to be coupled to and uncoupled from the electronic device. The button extends into the receiving room from outside of the enclosure and used to drive the transmission assembly move. The pusher assembly passes through the second through hole to push the electronic device away from the enclosure. When the hook assemblies are detached from the electronic device, the pusher assembly push the electronic device detach from the enclosure.

20 Claims, 15 Drawing Sheets

US 8,400,783 B2

DOCKING STATION FOR ELECTRONIC DEVICE

BACKGROUND

1. Technical Field

The present disclosure generally relates to docking stations, more particularly to a docking station capable of cooling or expanding functions of an electronic device.

2. Description of Related Art

Many prevailing electronic devices, such as notebooks, E-books, for example, are designed to have a portable small size to satisfy various requirements of clients. An electronic device with a small size has less connection ports, such as having only one Universal Serial Bus (USB), and only one Ethernet port, the electronic device has to meet strict demands on heat resistance. Docking stations can resolve the problems of cooling and expanding functions for the electronic devices. However, how to make the docking station have a securing structure to secure the electronic device with easy operation, safety and reliability is a subject in study.

Therefore, a need exists in the industry to overcome the described problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
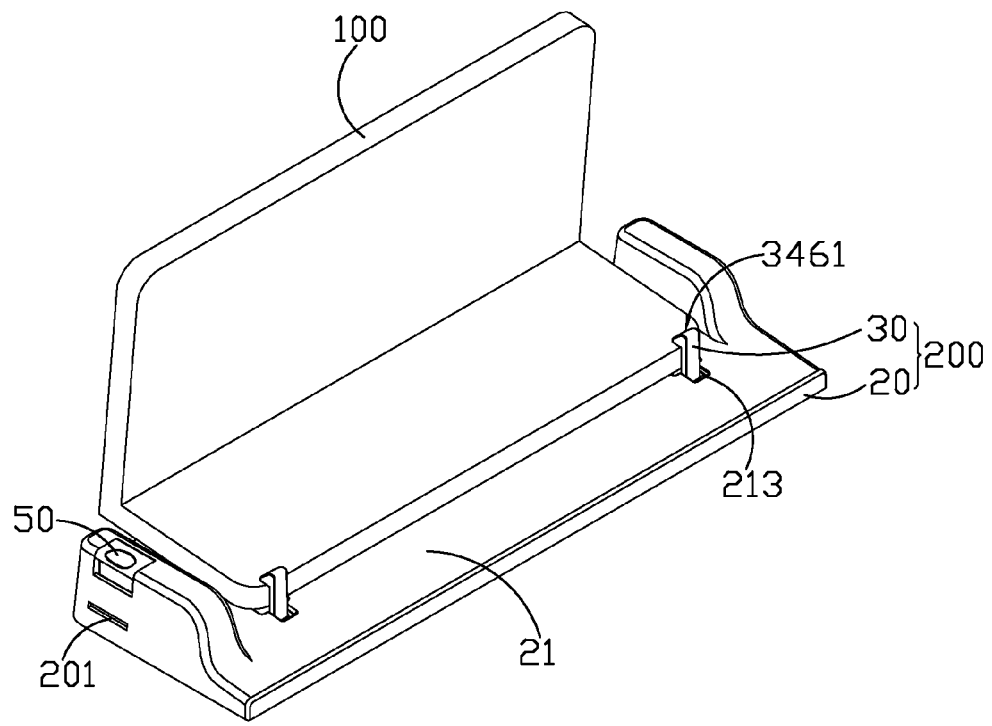
FIG. 1 is a perspective view of a docking station securing an electronic device of an exemplary embodiment of the disclosure.
Figure 2:
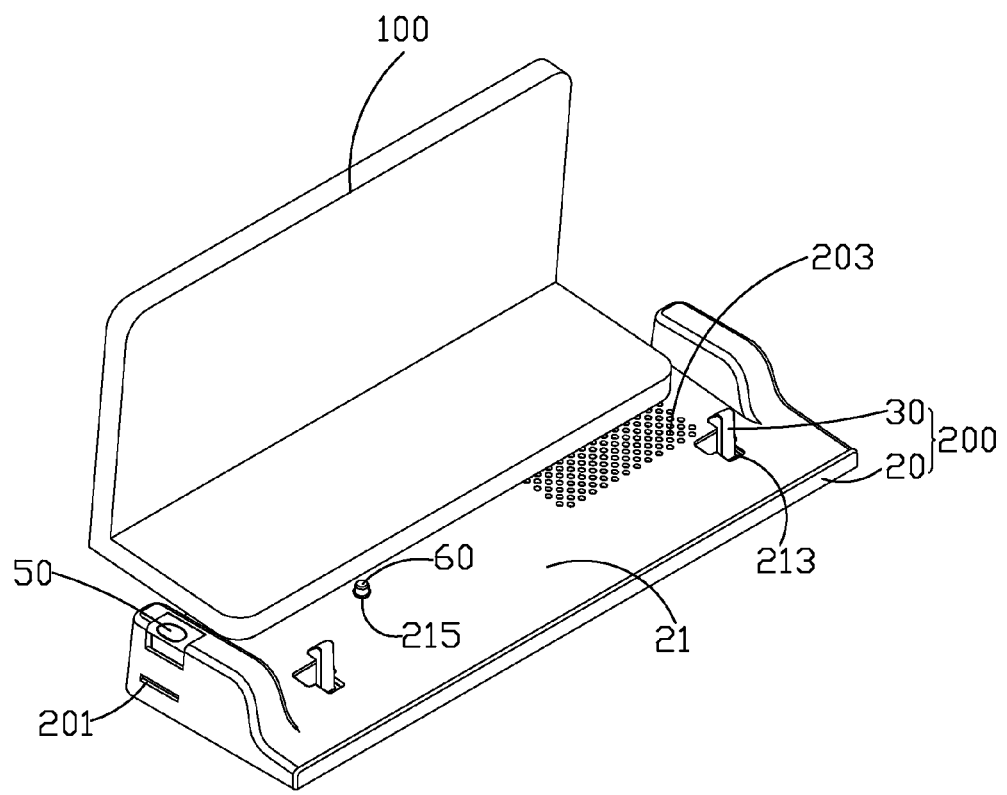
FIG. 2 is an exploded perspective view of the docking station and the electronic device of FIG. 1.
Figure 3:
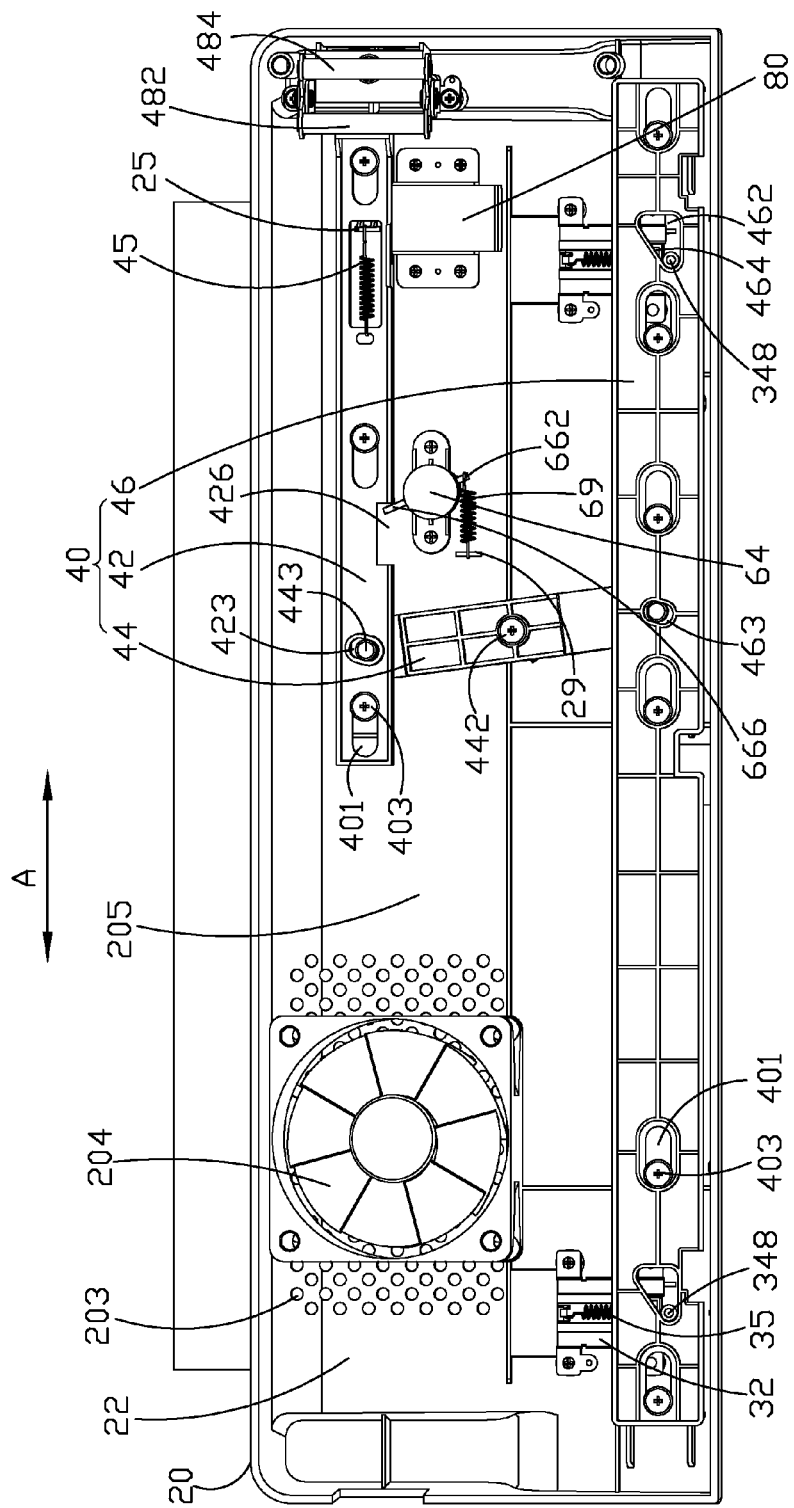
FIG. 3 is an inner structure view of the docking station of FIG. 1, in an unlocked state.

Referring to FIG. 1 and FIG. 2, a docking station 200 of an exemplary embodiment of the disclosure is coupled to an electronic device 100. The docking station 200 defines a plurality of input/output ports 201 (only one shown in FIGS. 1-2), and a plurality of cooling holes 203. The docking station 200 comprises an enclosure 20 and two hook assemblies 30. The enclosure 20 comprises a top surface 21 supporting the electronic device 100 and a bottom surface 22. As shown in FIG. 3, a fan 204 is installed onto the bottom surface 22 and corresponds to the plurality of cooling holes 203 to dissipate heat generated by the electronic device 100. In the embodiment, the enclosure 20 defines two first through holes 213 and a second through hole 215. The first through holes 213 and the second through hole 215 are defined from the top surface 21 to the bottom surface 22. The hook assemblies 30 are installed to the enclosure 20 on the bottom surface 22 and respectively pass through the first through holes 213 and out of the top surface 21.

Figure 4:
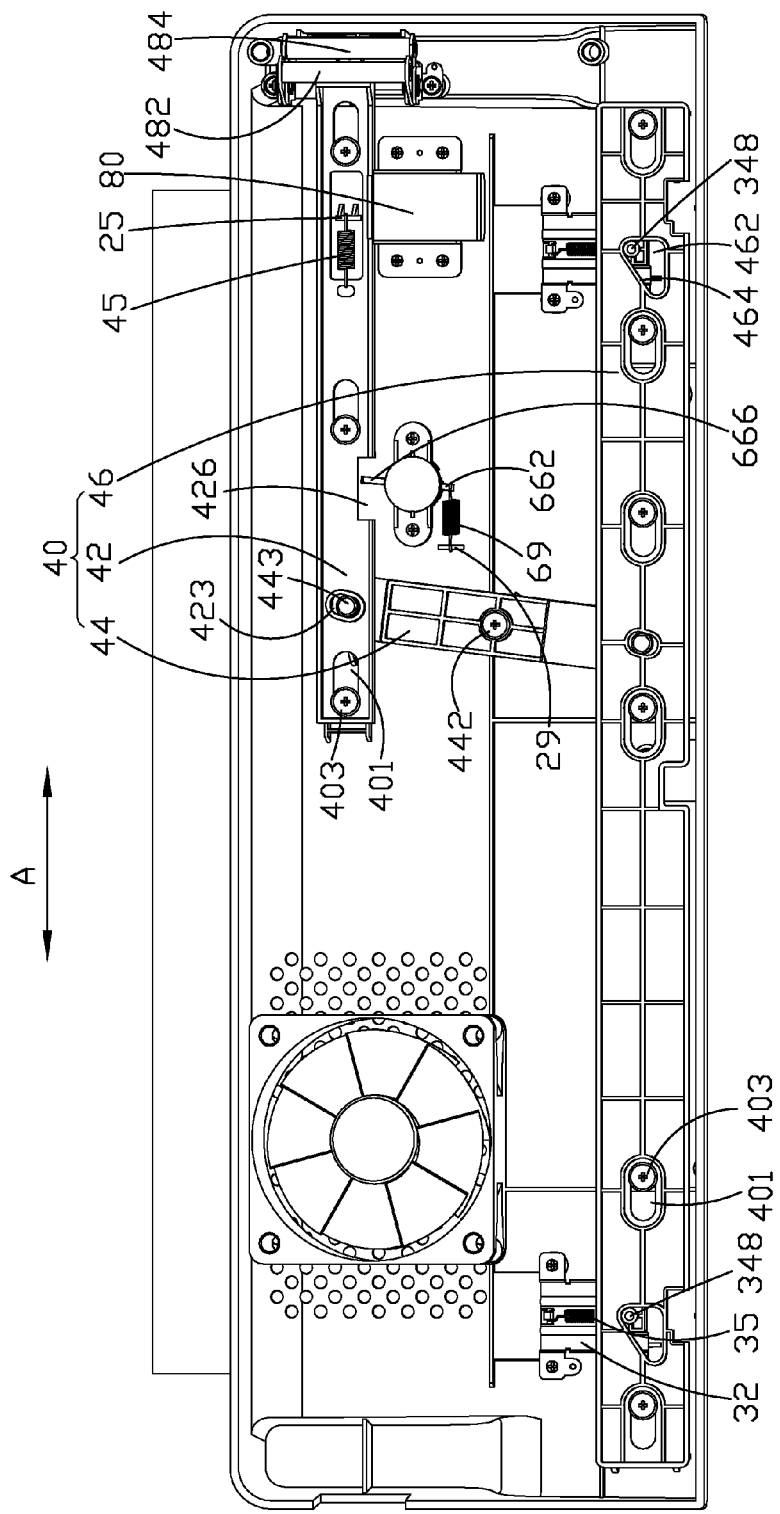
FIG. 4 is an inner structure view of the docking station of FIG. 1, in a locked state.

Referring to FIG. 3 and FIG. 4, the enclosure 20 defines a receiving room 205, the hook assemblies 30 are received in the receiving room 205 and pass through the first through holes 213 to secure the electronic device 100 on the top surface 21. The docking station 200 further comprises a transmission assembly 40, a button 50 and a pusher assembly 60. The transmission assembly 40 received in the receiving room 205, movably positioned on the bottom surface 22, and engages with the hook assemblies 30 to drive the hook assemblies 30 move forward and backward in the first through holes 213 to be coupled to and uncoupled from the electronic device 100. The button 50 structured on the bottom surface 22 is adapted to be pressed to drive the transmission assembly 40 move. The button 50 extends into the receiving room 205 from outside of the enclosure 20 to drive the transmission assembly 40 to move. The pusher assembly 60 passes through the second through hole 215 and moves in response to the movement of the transmission assembly 40 to push the electronic device 100 away from the top surface 21. When the hook assemblies 30 are detached from the electronic device 100, the pusher assembly 60 is driven by the transmission assembly 40 to move in the second through hole 215 to push the electronic device 100 detach from the enclosure 20.

In this embodiment, the two first through holes 213 and the second through hole 215 collectively form a triangle-shaped arrangement. The electronic device 100 is securely locked on the docking station 200 due to the triangle-shaped arrangement.

In this embodiment, the transmission assembly 40 comprises a first lever 42, a swinging lever 44 and a second lever 46. The swinging lever 44 pivotedly connects to the enclosure 20 with a pivot 442 configured at a center of the swinging lever 44. The first lever 42 and the second lever 46 respectively movably connect with the swinging lever 44 at two sides of the pivot 442. The first lever 42 is driven by the button 50 and moves and drives the swinging lever 44 to rotate about the pivot 442 relative to the enclosure 20, simultaneously, the swinging lever 44 drives the second lever 46 to move and engage with the hook assemblies 30. The hook assemblies 30 are driven by the second lever 46 to move in the first through holes 213.

The first lever 42 defines a first positioning groove 423 matching with the swinging lever 44. The second lever 46 defines a second positioning groove 463 matching with the swinging lever 44. Two opposite ends of the swinging lever 44 comprises two protrusions 443 movably received in the first positioning groove 423 and the second positioning groove 463, respectively. In this way, the swinging lever 44 is movably connected between the first lever 42 and the second lever 46. The first lever 42 and the second lever 46 are parallel with each other and respectively define a plurality of guide holes 401. A plurality of screws 403 respectively pass through the plurality of guide holes 401 and are screwed into the enclosure 20 to fix the first lever 42 and the second lever 46 to the enclosure 20. The guide holes 401 extend along a direction A, therefore, the first lever 42 and the second lever 46 can move back and forth along the direction A.

The first lever 42 is resiliently connected to the enclosure 20 via a spring 45. The enclosure 20 comprises a pedestal 25. The spring 45 connects the first lever 42 to the pedestal 25 to provide a restoring force for the first lever 42.

The second lever 46 defines two receiving grooves 462 respectively adjacent to the two first through holes 213. A sloped inner wall 464 of each of the receiving grooves 462 is inclined relative to the direction A. That is, the sloped inner wall 464 is inclined relative to the moving direction of the second lever 46. Each of the hook assemblies 30 engages with the sloped inner wall 464 and moves in the corresponding first through hole 213 with the movement of the second lever 46. The moving direction of the second lever 46 is perpendicular to that of the hook assemblies 30.

Figure 5:
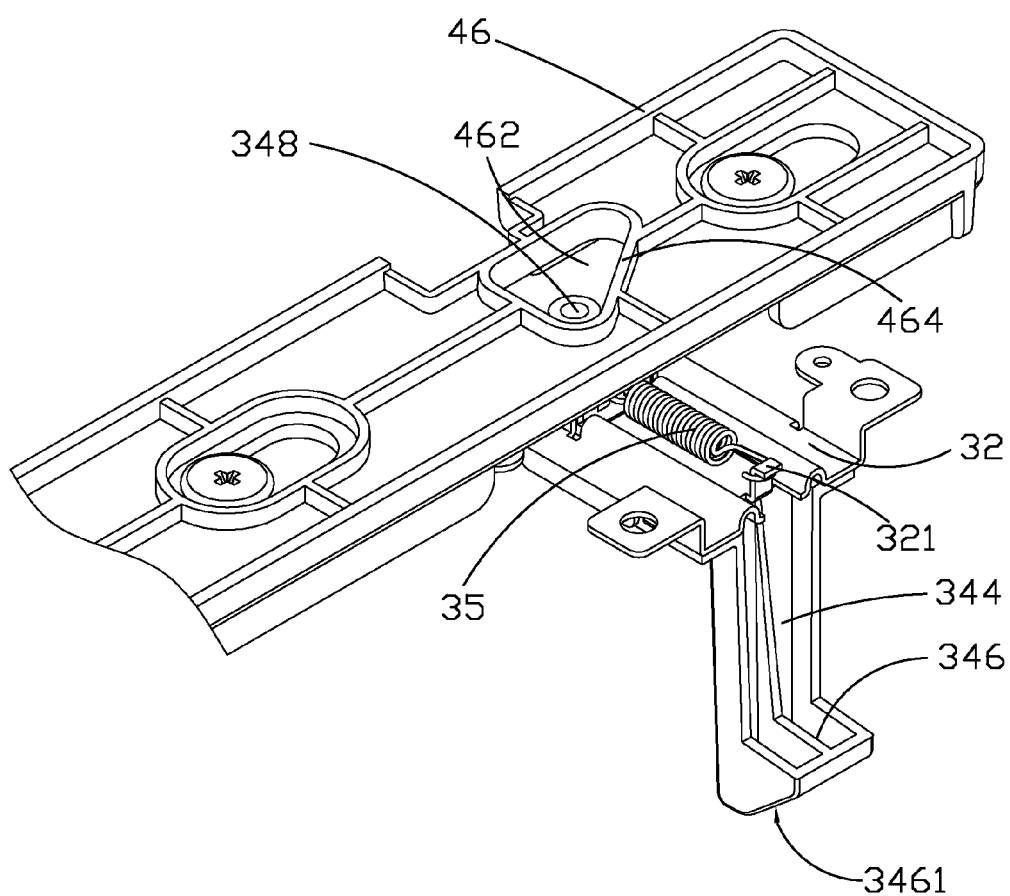
FIG. 5 is a perspective view showing relationship between a hook assembly and a second lever.
Figure 6:
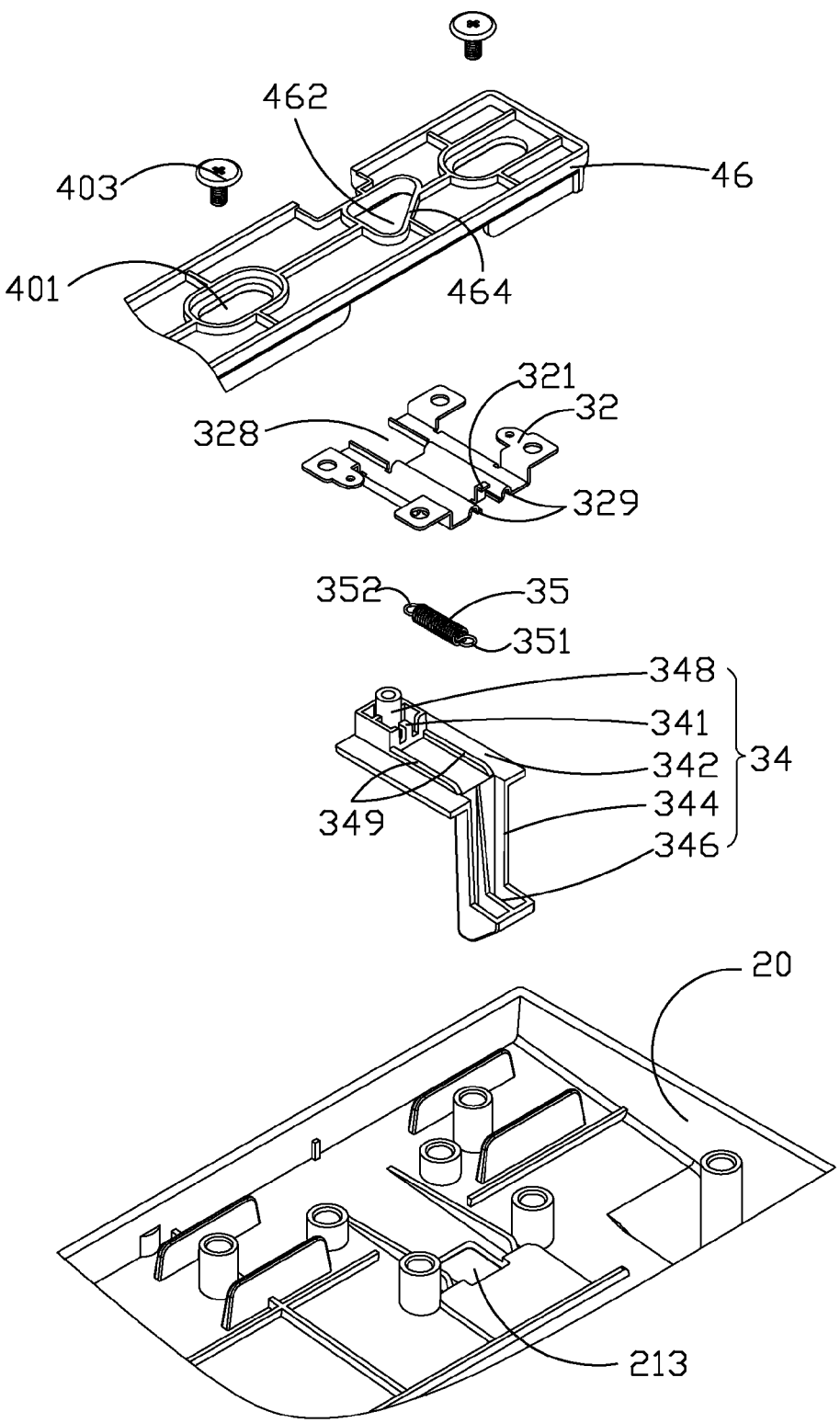
FIG. 6 is an exploded perspective view showing relationship between the hook assembly, the second lever and an enclosure.
Figure 7:
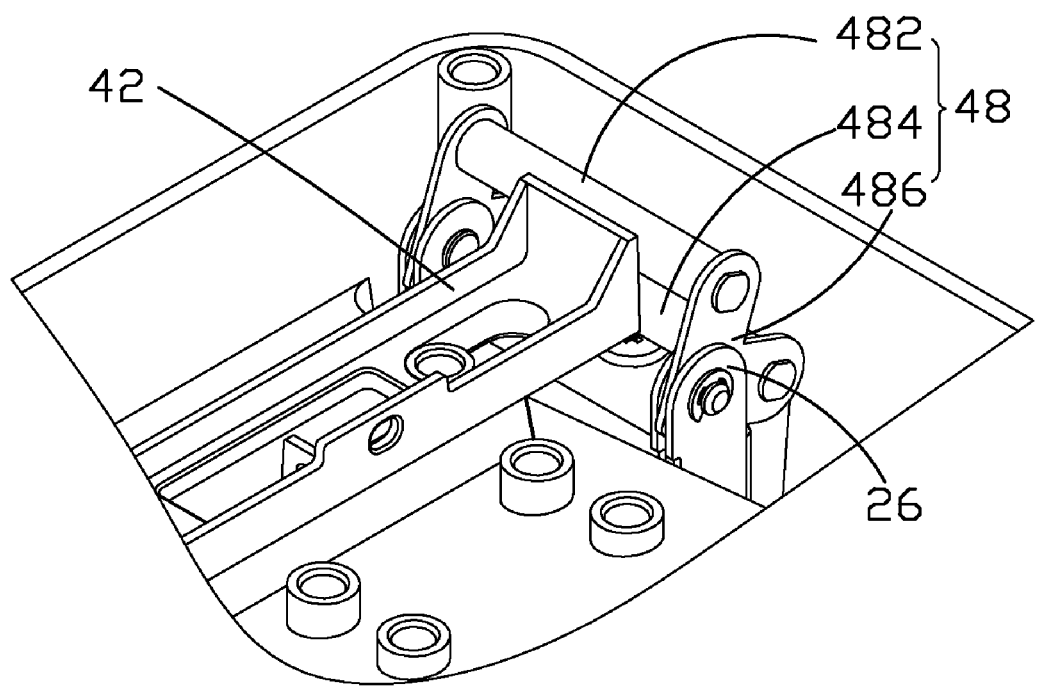
FIG. 7 is a perspective view showing relationship between a first lever, a rotatable assembly and the enclosure.
Figure 8:
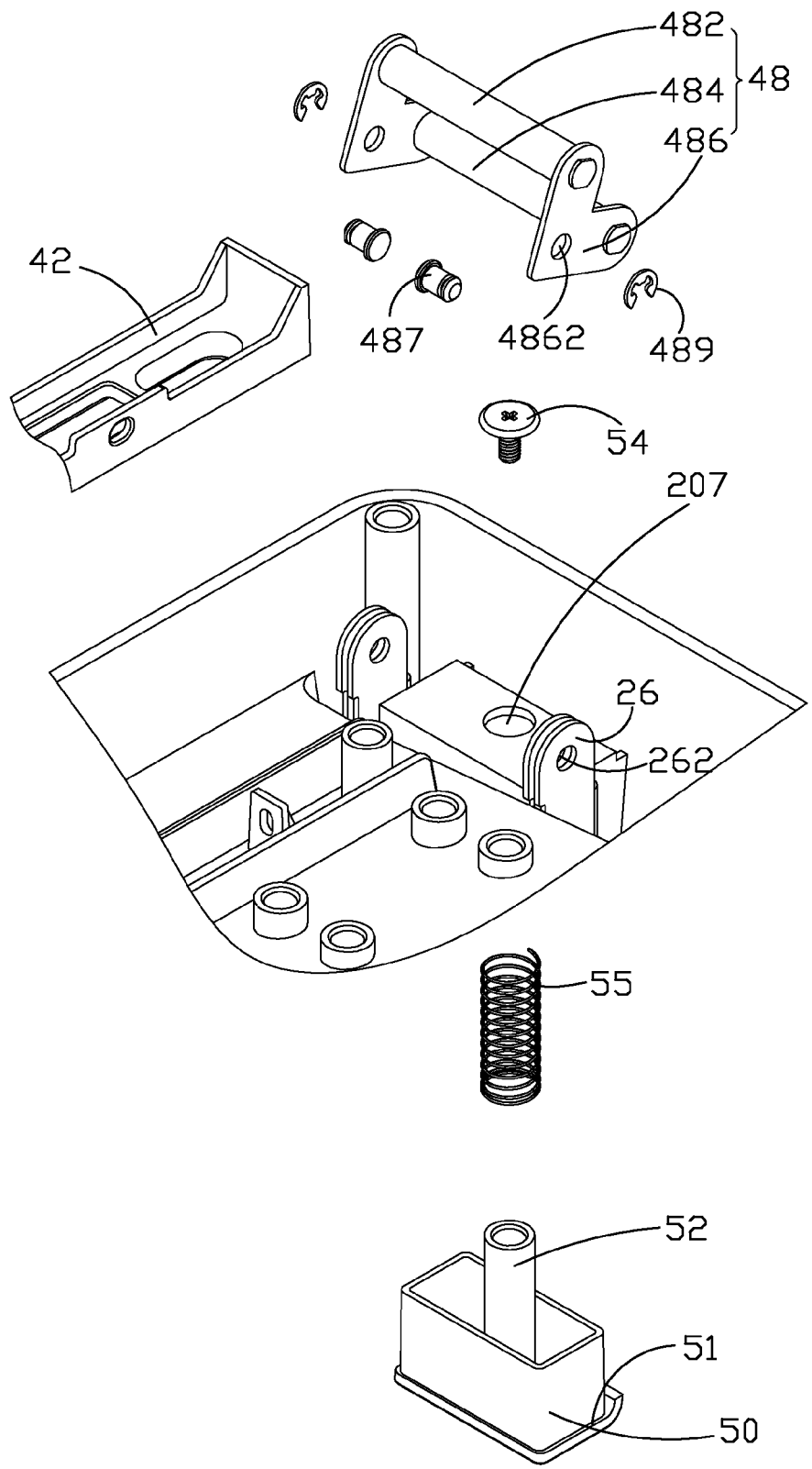
FIG. 8 is an exploded perspective view of FIG. 7.
Figure 9:
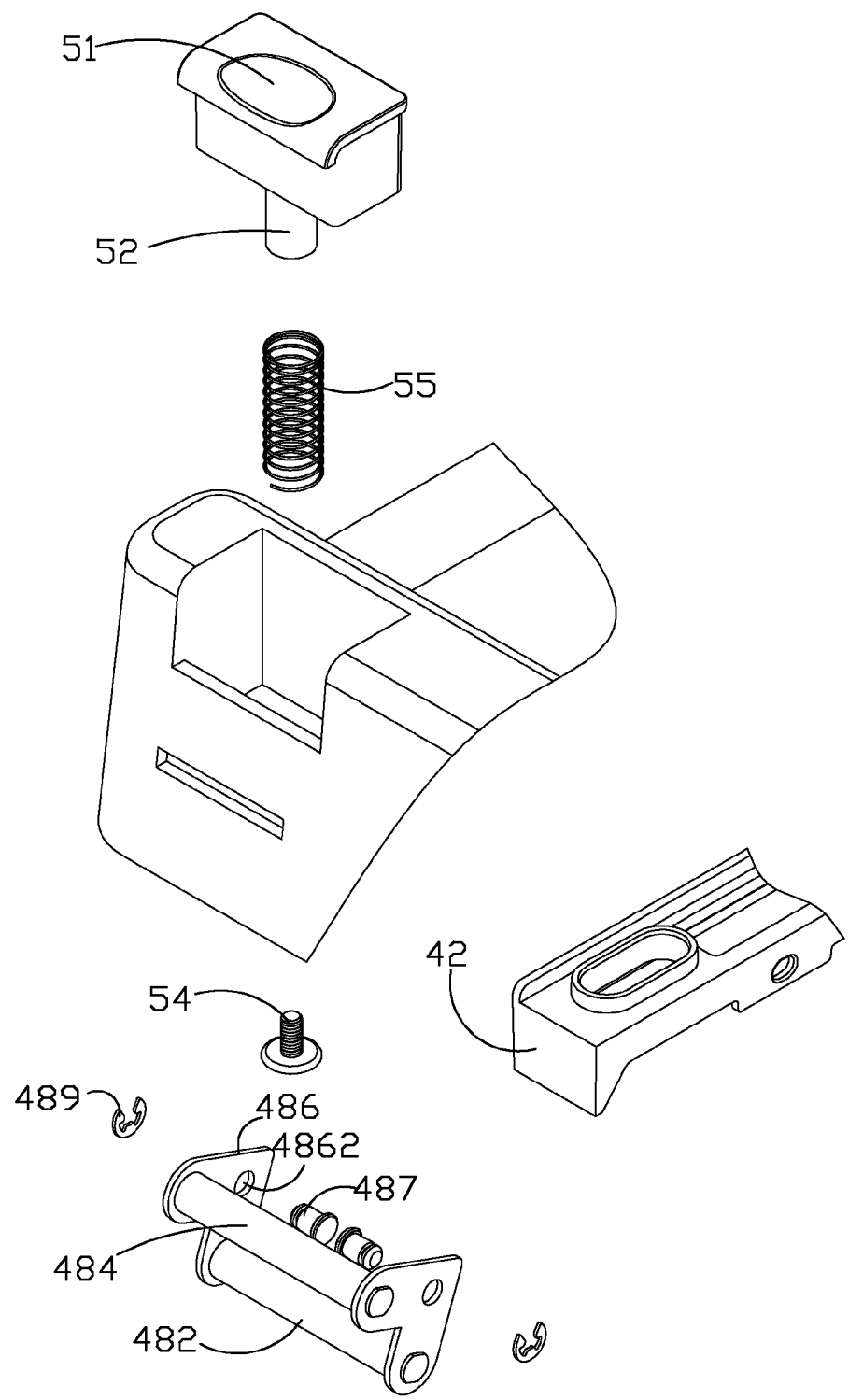
FIG. 9 is an exploded perspective view of FIG. 7, showing from another direction relative to FIG. 8.
Figure 10:
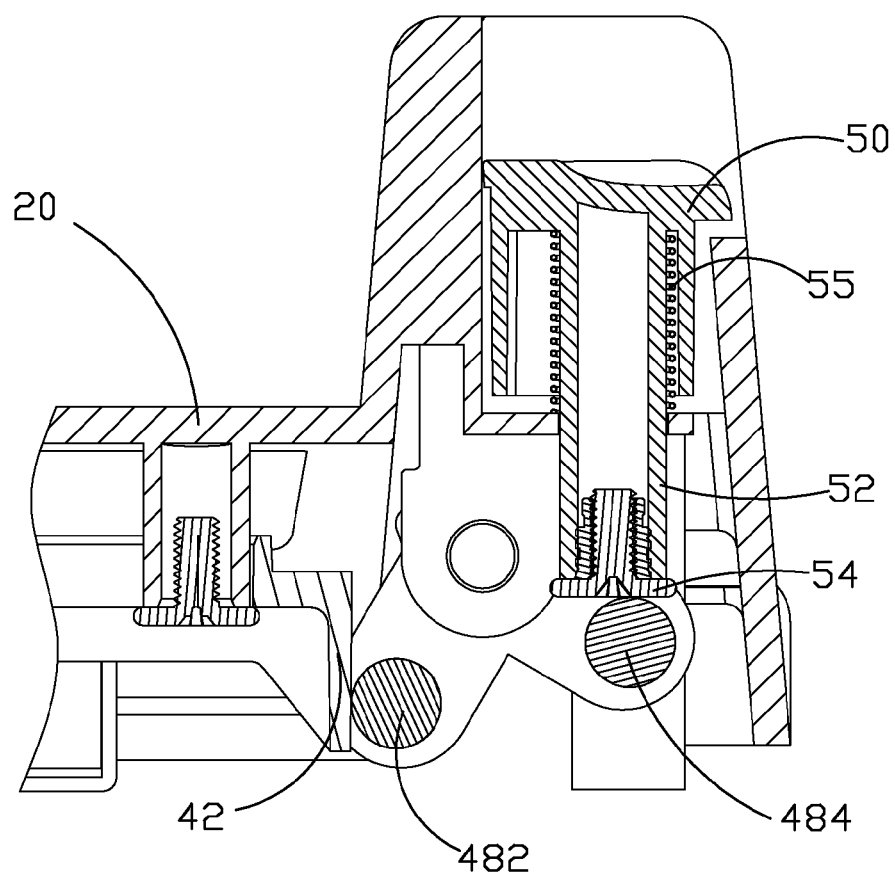
FIG. 10 is a cross-sectional view showing relationship between the first lever, the rotatable assembly and a button, in the unlocked state.
Figure 11:
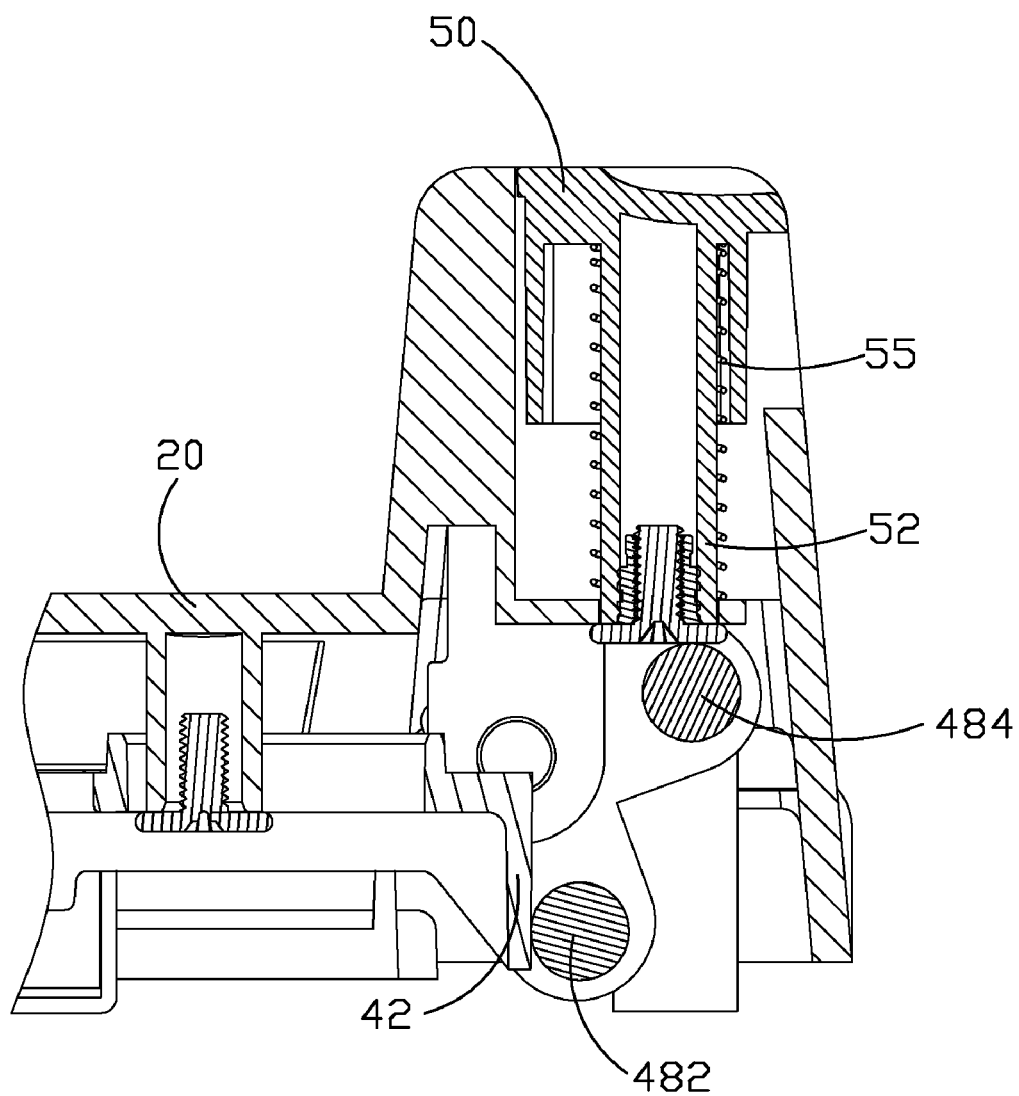
FIG. 11 is a cross-sectional view showing relationship between the first lever, the rotatable assembly and the button, in the locked state.

Referring to FIG. 5 and FIG. 6, each of the hook assemblies 30 comprises a fixing plate 32 and a hook member 34. The fixing plate 32 is fixed to the enclosure 20 and located between the second lever 46 and the top surface 21. The hook member 34 comprises a positioning portion 342, a connecting arm 344, a hook portion 346 and an engaging portion 348. The positioning portion 342 is positioned between the top surface 21 and the fixing plate 32 and resiliently connected to the fixing plate 32. The engaging portion 348 extends from the positioning portion 342 to the receiving groove 462 of the second lever 46 and engages with the sloped inner wall 464 of the receiving groove 462. The connecting arm 344 is perpendicular to the positioning portion 342 and passes through the first through hole 213. The hook portion 346 is configured on the connecting arm 344 and located outside of the enclosure 20 to secure the electronic device 100 on the top surface 21. A top surface 3461 is configured on an end of the hook portion 346 away from the connecting arm 344 and inclined relative to the top surface 21.

The fixing plate 32 comprises a first fixing portion 321. The hook member 34 comprises a second fixing portion 341. A spring 35 connects between the fixing plate 32 and the hook member 34 via two fixing ends 351, 352 of the spring 35 respectively fixed to the first fixing portion 321 and the second fixing portion 341 to provide a restoring force for the hook member 34. The fixing plate 32 defines a passing hole 328 opposite to the receiving groove 462. The engaging portion 348 of the hook member 34 passes through the passing hole 328 and extends into the receiving groove 462 to engage with the sloped inner wall 464. The fixing plate 32 further defines a pair of sliding grooves 329 extending along a direction perpendicular to the direction A. The hook member 34 comprises a pair of sliding blocks 349 respectively received in the pair of sliding grooves 329 to limit movement direction of the hook member 34 relative to the fixing plate 32.

Referring to FIGS. 7-11, the transmission assembly 40 further comprises a rotatable assembly 48 received in the receiving room 205 and pivotedly connecting to the enclosure 20. The rotatable assembly 48 is located between the first lever 42 and the button 50 and comprises a driven member 482 urging the first lever 42 and a driving member 484 urging the button 50. The button 50 drives the rotatable assembly 48 to rotate relative to the enclosure 20, and ultimately drive the first lever 42 move along the direction A.

The rotatable assembly 48 comprises a pair of mounted plates 486. The enclosure 20 comprises a pair of mounting posts 26. The pair of mounted plates 486 respectively pivotedly connect to the pair of mounting posts 26. The driven member 482 and the driving member 484 are fixed between the pair of mounted plates 486. In this embodiment, each of the mounted plates 486 is configured as V-shaped, and the driven member 482 and the driving member 484 are respectively mounted on two ends of opening of the V-shaped mounted plate 486. Each of the mounted plates 486 defines a first mounting hole 4862. Each of the mounting posts 26 defines a second mounting hole 262. The rotatable assembly 48 is mounted to the enclosure 20 via a pair of pins 487 passing through the first and second mounting holes 4862, 262 and respectively engaging a gasket 489. The rotatable assembly 48 can rotate relative to the enclosure 20 about the pair of pins 487.

The enclosure 20 defines an aligning hole 207. The button 50 passes through the aligning hole 207 and extends into the receiving room 205 to engage with the driving member 484. The button 50 comprises a pressing portion 51 and a rod 52 extending from the pressing portion 51 and passing through the aligning hole 207 to engage with a screw 54. The screw 54 connects the rod 52 of the button 50 to the enclosure 20 and limits movement of the rod 52 out of the enclosure 20 from the aligning hole 207. A spring 55 placed around the rod 52 resiliently connects between the pressing portion 51 and the enclosure 20 to provide restoring force for the pressing portion 51.

Figure 12:
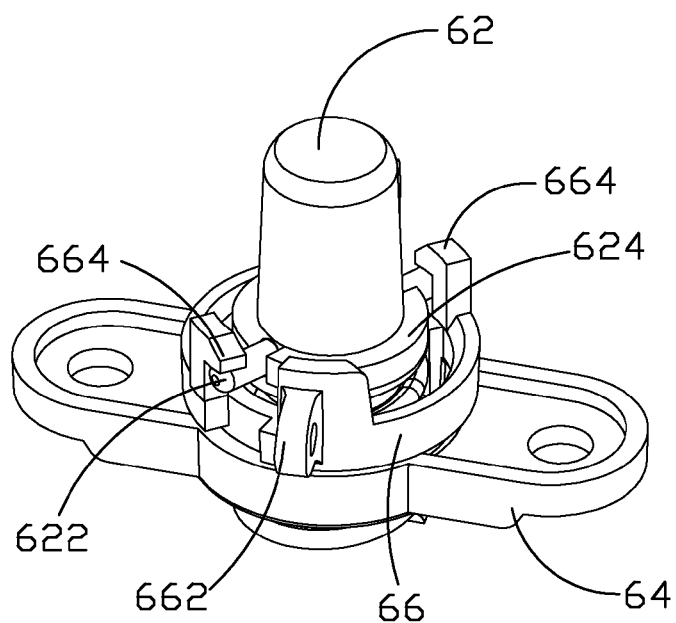
FIG. 12 is a perspective view of a pusher assembly of the docking station of FIG. 1.
Figure 13:
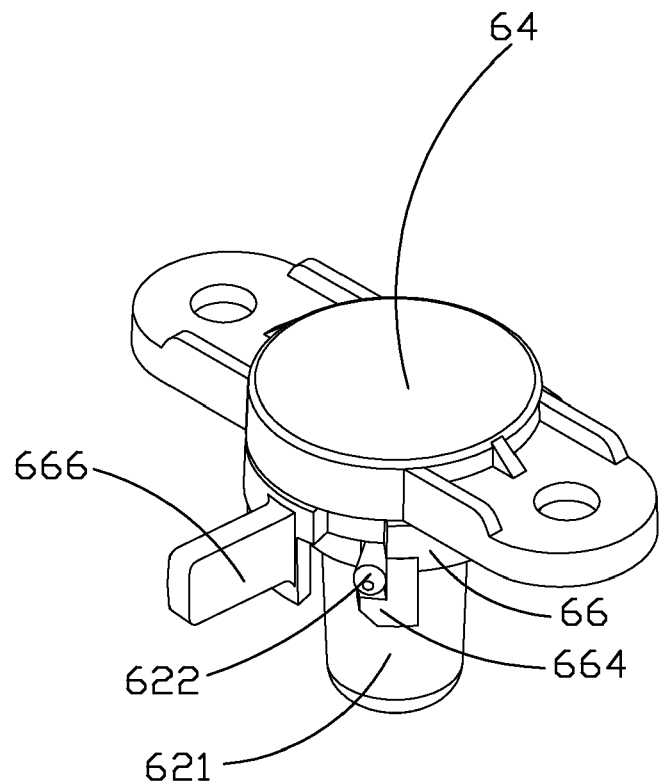
FIG. 13 is another perspective view of the pusher assembly of FIG. 12.
Figure 14:
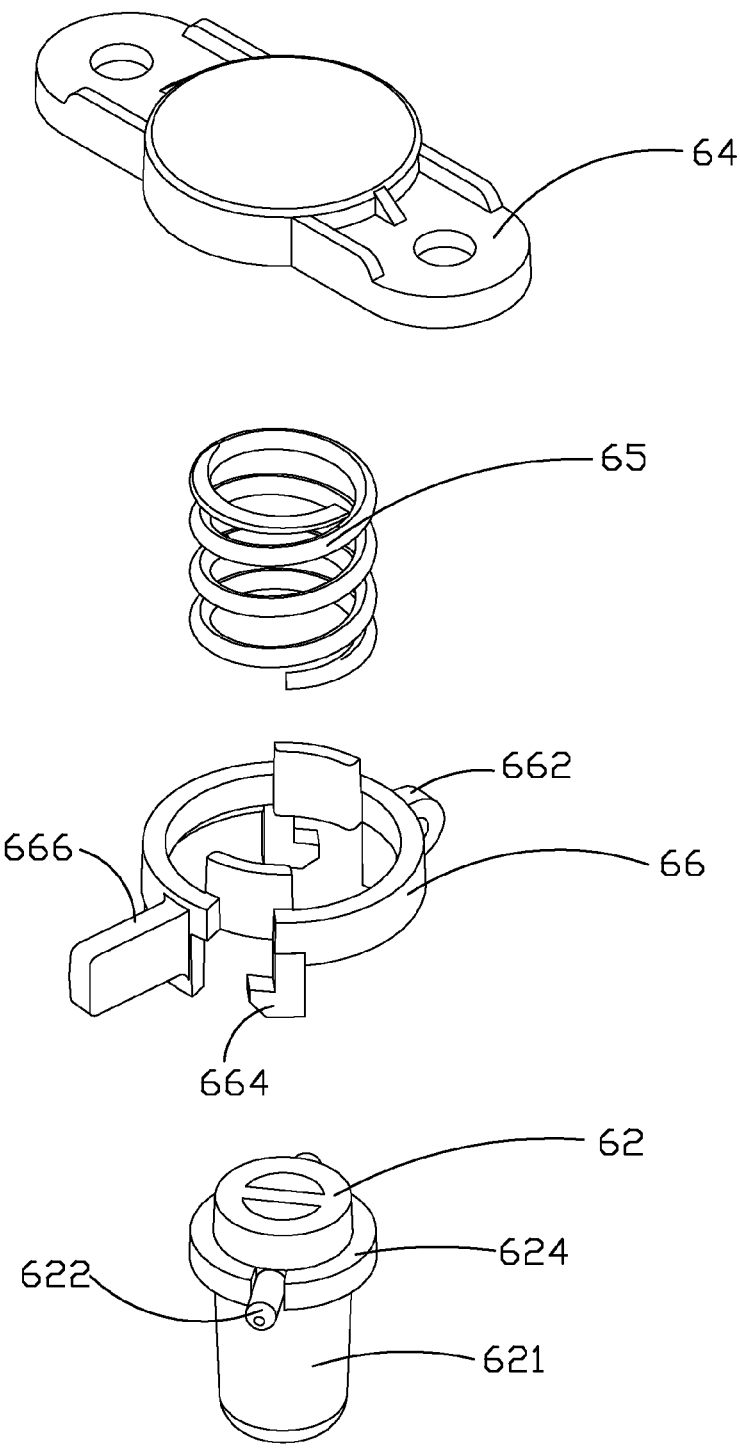
FIG. 14 is an exploded perspective view of FIG. 13.

Referring to FIGS. 12-14, the pusher assembly 60 received in the receiving room 205 comprises a base 64 fixed to the top surface 21 of the enclosure 20, a rotating ring 66, a spring 65 and a pusher post 62 passing through the second through hole 215. The rotating ring 66 and the pusher post 62 are positioned between the base 64 and the top surface 21. The spring 65 is positioned between the base 64 and the pusher post 62 to urge the pusher post 62 to resist the electronic device 100. The rotating ring 66 is resiliently connected to the enclosure 20 and rotatably positioned to the base 64. The rotating ring 66 comprises a fixing portion 662. The enclosure 20 comprises a pedestal 29, as shown in FIG. 3 and FIG. 4. A spring 69 connects between the fixing portion 662 and the pedestal 29 to resiliently connect the rotating ring 66 to the enclosure 20.

The rotating ring 66 comprises a tab 666 and a latching portion 664. The latching portion 664 engages with the pusher post 62 to position the pusher post 62 to the rotating ring 66. The rotating ring 66 engages with the transmission assembly 40 and rotates in the base 64 via the transmission assembly 40 moving to push the tab 666. The first lever 42 of the transmission assembly 40 defines a recess 426. The tab 666 extends into the recess 426 to engage with the transmission assembly 40. When the first lever 42 moves toward the tab 666, the first lever 42 pushes the tab 666 to make the rotating ring 66 rotate relative to the base 64.

When the tab 666 is pushed by the transmission assembly 40, the rotate ring 66 rotates relative to the base 64, and the latching portion 664 moves to release the pusher post 62. Therefore, the pusher post 62 is detached from the rotating ring 66 and moves toward the electronic device 100 under resilient force of the spring 65, to push the electronic device 100 away from the enclosure 20.

The pusher post 62 comprises a pusher portion 621, a latching block 622 perpendicularly extending from the pusher portion 621 and a positioning flange 624 configured around the pusher portion 621. The pusher portion 621 passes through the second through hole 215 to urge the electronic device 100. The latching block 622 engages with the latching portion 664 of the rotating ring 66 to position the pusher post 62 to the rotating ring 66. The positioning flange 624 abuts against the bottom surface 22 of the enclosure 22 to limit movement of the pusher post 62 move out of the enclosure 20.

The electronic device 100 is located above the docking station 200 with an edge of the electronic device 100 contacting the top surface 3461 of the hook portion 346. The electronic device 100 make the hook member 34 move due to the gravity of the electronic device 100, then the electronic device 100 is coupled to the docking station 200 with the hook portions 346 latching the edge of the electronic device 100.

When the electronic device 100 is required to be removed from the docking station 200, the button 50 is pressed to make the driving member 484 of the rotatable assembly 48 rotate relative to the enclosure 20, simultaneously, the driven member 482 of the rotatable assembly 48 drives the first lever 42 of the transmission assembly 40 move along the direction A. Accordingly, the swinging lever 44 rotates about the pivot 442 to drive the second lever 46 move toward contrary direction relative to the first lever 42. Therefore, the hook assemblies 30 are driven by the second lever 46 to move in the first through holes 213 to be uncoupled from the electronic device 100. Simultaneously, the first lever 42 drives the tab 666 of the pusher assembly 60 move to make the pusher post 62 depart from the rotating ring 66 and push the electronic device 100 away from the enclosure 20. Therefore, the electronic device 100 is easily removed from the docking station 200.

Figure 15:
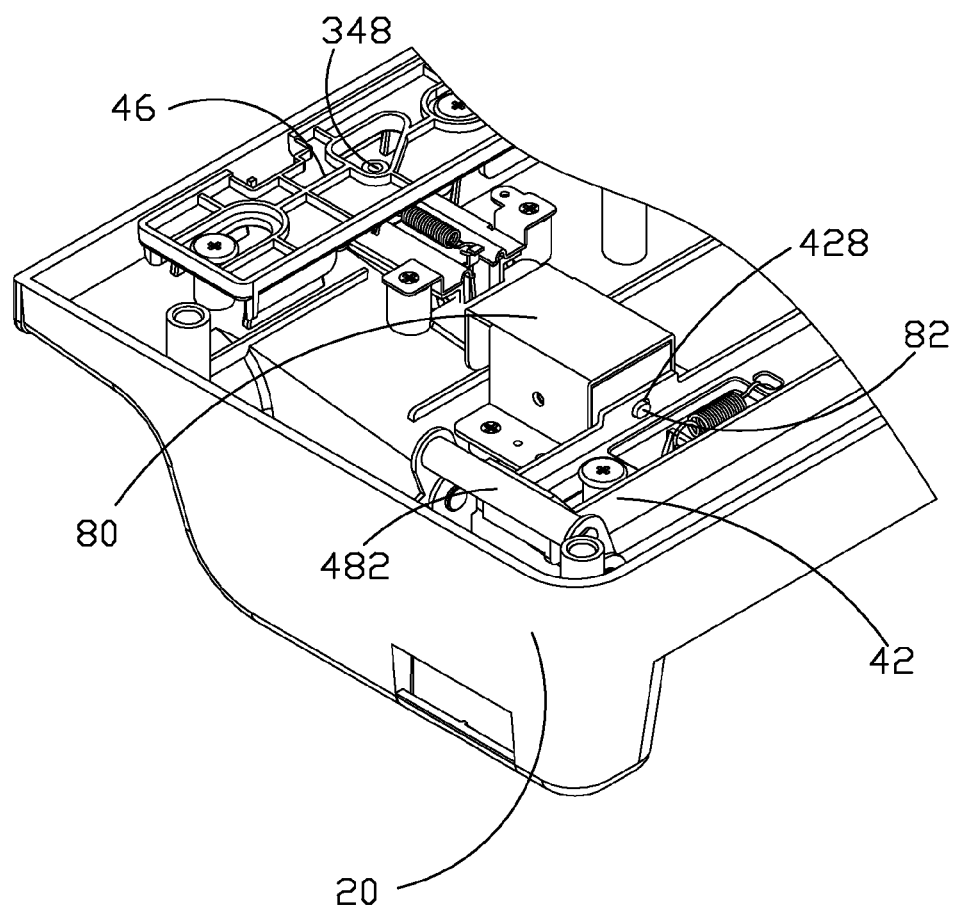
FIG. 15 is a perspective view showing relationship between a solenoid-actuated member and the first lever of the docking station.

Referring to FIG. 15, the docking station 200 further comprises a solenoid-actuated member 80 installed onto the enclosure 20 to engage with the transmission assembly 40 to limit movement of the transmission assembly 40 during the docking station 200 powered on. That is, when the docking station 200 is powered on, the transmission assembly 40 can not move relative to the enclosure 20 due to the solenoid-actuated member 80 locking the transmission assembly 40. The transmission assembly 40 defines a latch hole 428. The solenoid-actuated member 80 comprises a latch block 82 engaging with the latch hole 428 to limit movement of the transmission assembly 40 relative to the enclosure 20. When the electronic device 100 is coupled to the docking station 200 and powered on, the solenoid-actuated member 80 engages with the transmission assembly 40, therefore, the button 50 can't be pressed and the electronic device 100 can't be moved away from the docking station 200. That is, the electronic device 100 can be moved away from the docking station 200 only when powered off, preventing user misoperation.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A docking station, comprising:
an enclosure, comprising a top surface supporting an electronic device, and defining a receiving room, two first through holes and a second through hole;
two hook assemblies, installed onto the enclosure in the receiving room, and passing through the first through holes to secure the electronic device on the top surface;
a transmission assembly, received in the receiving room, and engaging with the hook assemblies to drive the hook assemblies move forward and backward in the first through holes to be coupled to and uncoupled from the electronic device;
a button, extending into the receiving room from outside of the enclosure and used to drive the transmission assembly to move away from the enclosure; and
a pusher assembly, passing through the second through hole to urge the electronic device;
wherein when the hook assemblies are detached from the electronic device, the pusher assembly is driven by the transmission assembly to move in the second through hole to push the electronic device to detach from the enclosure.

2. The docking station as claimed in claim 1, further comprising a solenoid-actuated member installed to the enclosure to engage with the transmission assembly to limit movement of the transmission assembly during the docking station powered on.

3. The docking station as claimed in claim 2, wherein the transmission assembly defines a latch hole, the solenoid-actuated member comprises a latch block engaging with the latch hole to limit the transmission assembly from moving.

4. The docking station as claimed in claim 1, wherein the transmission assembly comprises a first lever driven by the button, a swinging lever and a second lever engaging with and driving the hook assemblies move in the first through holes, the swinging lever pivotedly connects to the enclosure with a pivot, the first lever and the second lever respectively movably connect the swinging lever at two sides of the pivot.

5. The docking station as claimed in claim 4, wherein the second lever defines two receiving groove, a sloped inner wall of each of the receiving grooves is inclined relative to a moving direction of the second lever, the hook assemblies respectively engage with the sloped inner walls and move in the first through holes, and the moving direction of the second lever is perpendicular to that of the hook assemblies.

6. The docking station as claimed in claim 5, wherein each of the hook assemblies comprises a fixing plate and a hook member, the fixing plate is fixed to the enclosure and located between the second lever and the enclosure, the hook member comprises a positioning portion positioned between the top surface and the fixing plate and resiliently connected to the fixing plate, an engaging portion extending from the positioning portion to the receiving groove of the second lever and engaging with the sloped inner wall of the receiving groove, a connecting arm perpendicular to the positioning portion and passing through the first through hole and a hook portion configured on the connecting arm and located on outside of the enclosure to secure the electronic device on the top surface.

7. The docking station as claimed in claim 4, wherein the transmission assembly further comprises a rotatable assembly received in the receiving room and pivotedly connecting to the enclosure, the rotatable assembly located between the first lever and the button comprises a driven member urging the first lever and a driving member urging the button, the button drives the rotatable assembly rotate relative to the enclosure to drive the first lever move.

8. The docking station as claimed in claim 7, wherein the transmission assembly comprises a pair of mounted plates, the enclosure comprises a pair of mounting posts, the pair of mounted plates respectively pivotedly connecting to the pair of mounting posts, the driven member and the driving member are fixed between the pair of mounted plates.

9. The docking station as claimed in claim 1, wherein the pusher assembly comprises a base fixed to the enclosure, a rotating ring, a spring and an pusher post passing through the second through hole, the rotating ring and the pusher post are positioned between the base and the enclosure, the spring is positioned between the base and the pusher post to urge the pusher post to resist the electronic device, the rotating ring is resiliently connected to the enclosure and comprises a tab engaging with the transmission assembly and a latching portion, the latching portion engages with the pusher post to position the pusher post to the rotating ring, the rotating ring rotates via the transmission assembly driving the tab to detach the pusher post from the rotating ring, and the pusher post move to push the electronic device under resilient force of the spring.

10. The docking station as claimed in claim 9, wherein the pusher post comprises an pusher portion, a latching block perpendicularly extending from the pusher portion and a positioning flange configured around the pusher portion, the pusher portion passes through the second through hole to urge the electronic device, the latching block engages with the latching portion of the rotating ring to position the pusher post to the rotating ring, the positioning flange is used to resist on the enclosure to limit the pusher post move out of the enclosure.

11. The docking station as claimed in claim 1, wherein the two first through holes and the second through hole collectively make a triangle-shaped arrangement.

12. A docking station, comprising:
an enclosure, comprising a top surface and a bottom surface, wherein two first through holes and a second through hole are defined from the top surface to the bottom surface;
two hook assemblies, installed onto the enclosure on the bottom surface and passing through the first through holes and out of the top surface;
a transmission assembly, movably positioned on the bottom surface and engaging with the hook assemblies to drive the hook assemblies move forward and backward in the first through holes;
a button, structured in the enclosure and adapted to be pressed to drive the transmission assembly move; and
a pusher assembly, received in the second through hole and moving in response to the movement of the transmission assembly.

13. The docking station as claimed in claim 12, further comprising a solenoid-actuated member installed to the enclosure to engage with the transmission assembly to limit movement of the transmission assembly during the docking station powered on.

14. The docking station as claimed in claim 12, wherein the transmission assembly comprises a first lever driven by the button, a swinging lever and a second lever engaging with and driving the hook assemblies move in the first through holes, the swinging lever pivotedly connects to the enclosure with a pivot, the first lever and the second lever respectively movably connect the swinging lever at two sides of the pivot.

15. The docking station as claimed in claim 14, wherein the second lever defines two receiving groove, a sloped inner wall of each of the receiving grooves is inclined relative to a moving direction of the second lever, the hook assemblies respectively engage with the sloped inner walls to move in the first through holes, and the moving direction of the second lever is perpendicular to that of the hook assemblies.

16. The docking station as claimed in claim 15, wherein each of the hook assemblies comprises a fixing plate and a hook member, the fixing plate is fixed to the bottom surface and located between the second lever and the bottom surface, the hook member comprises a positioning portion positioned between the bottom surface and the fixing plate and resiliently connected to the fixing plate, an engaging portion extending from the positioning portion to the receiving groove of the second lever and engaging with the sloped inner wall of the receiving groove, a connecting arm perpendicular to the positioning portion and passing through the first through hole and a hook portion configured on the connecting arm and located on outside of the enclosure to secure the electronic device on the top surface.

17. The docking station as claimed in claim 14, wherein the transmission assembly further comprises a rotatable assembly received in the receiving room and pivotedly connecting to the enclosure, the rotatable assembly located between the first lever and the button comprises a driven member urging the first lever and a driving member urging the button, the button drives the rotatable assembly rotate relative to the enclosure to drive the first lever move.

18. The docking station as claimed in claim 17, wherein the transmission assembly comprises a pair of mounted plates, the enclosure comprises a pair of mounting posts, the pair of mounted plates respectively pivotedly connecting to the pair of mounting posts, the driven member and the driving member are fixed between the pair of mounted plates.

19. The docking station as claimed in claim 12, wherein the pusher assembly comprises a base fixed to the bottom surface of the enclosure, a rotating ring, a spring and an pusher post passing through the second through hole, the rotating ring and the pusher post are positioned between the base and the bottom surface, the spring is positioned between the base and the pusher post to urge the pusher post to resist the electronic device, the rotating ring is resiliently connected to the enclosure and comprises a tab engaging with the transmission assembly and a latching portion, the latching portion engages with the pusher post to position the pusher post to the rotating ring, the rotating ring rotates via the transmission assembly driving the tab to detach the pusher post from the rotating ring, and the pusher post move to push the electronic device under resilient force of the spring.

20. The docking station as claimed in claim 19, wherein the pusher post comprises an pusher portion, a latching block perpendicularly extending from the pusher portion and a positioning flange configured around the pusher portion, the pusher portion passes through the second through hole to urge the electronic device, the latching block engages with the latching portion of the rotating ring to position the pusher post to the rotating ring, the positioning flange is used to resist on the enclosure to limit the pusher post move out of the enclosure.

* * * * *